United States Patent [19]

Armond et al.

[11] 4,144,037

[45] Mar. 13, 1979

[54] GAS SEPARATION

[75] Inventors: John W. Armond, Great Bookham; Martyn S. Ray, Hednesford, both of England

[73] Assignee: Boc Limited, London, England

[21] Appl. No.: 772,214

[22] Filed: Feb. 25, 1977

[30] Foreign Application Priority Data

Feb. 27, 1976 [GB] United Kingdom ................. 7894/76

[51] Int. Cl.² ............................................. B01D 53/04
[52] U.S. Cl. ........................................... 55/58; 55/62; 55/68; 55/75
[58] Field of Search .................. 55/75, 76, 60, 25, 58, 55/389, 26, 33, 62, 74, 179, 387

[56] References Cited

U.S. PATENT DOCUMENTS

| 3,430,418 | 3/1969 | Wagner ..................................... 55/25 |
| 3,788,037 | 1/1974 | Shell et al. ............................... 55/58 |
| 3,923,477 | 12/1975 | Armond et al. ......................... 55/68 |

FOREIGN PATENT DOCUMENTS 1437344   1976   United Kingdom ........................ 55/25

Primary Examiner—Robert H. Spitzer
Attorney, Agent, or Firm—Dennison, Dennison, Meserole, & Pollack

[57] ABSTRACT

A process for increasing the proportion of a gas in a gaseous mixture of which it is a component. The gaseous mixture is allowed to be drawn through an adsorbent bed in a substantially unpressurized condition by the action of a reduced pressure applied to an outlet of the bed. The bed is then regenerated prior to a further admission of the gaseous mixture thereto.

14 Claims, 8 Drawing Figures

GAS SEPARATION

FIELD OF THE INVENTION

This invention relates to separation of gases. More particularly it is concerned with such separation using a material which adsorbs more readily one or more components of a gas mixture than another or other components of the mixture.

BACKGROUND TO THE INVENTION

In conventional gas separation using adsorption techniques, it is usual to pass the gaseous mixture into an absorbent bed under pressure and to obtain from the bed an enriched gas mixture which constitutes the desired product and is still at a small positive pressure. If the product is required at a high pressure it must be compressed separately. The adsorbent bed is normally regenerated before it becomes completely saturated by applying a vacuum to the bed which has the effect of drawing off the adsorbed constituents of the gas mixture ready for a further supply to the bed of feed gas mixture to be separated. It will be appreciated that such plants can require three separate pumps in order to produce product gas at high positive pressures and can consequently constitute reasonably complex plants having a relatively high capital cost and power consumption, particularly as the pump required for compressing the feed gas mixture can use a significant amount of power.

SUMMARY OF THE INVENTION

According to the invention, there is provided, a process for increasing the proportion of a gas in a gaseous mixture of which it is a component, which process comprises allowing the gaseous mixture in substantially unpressurized condition to be drawn through a bed of an adsorbent which preferentially adsorbs one or more other components of the gas mixture, by the action of a reduced pressure applied to an outlet of the bed, e.g. by a pump capable of applying a reduced pressure, usually a soft vacuum, and of compressing gas withdrawn from the bed to a superatmospheric delivery pressure, and then regenerating the bed, preferably by evacuation thereof, prior to a further admission of the gaseous mixture to the bed.

The invention also provides apparatus for utilizing the process for increasing the proportion of a gas in a gaseous mixture, which apparatus comprises a bed for containing an adsorbent which preferentially adsorbs one or more other components of the gas mixture, passage means to allow the gas mixture to pass to an inlet of the bed, means to apply a reduced pressure to a product outlet of the bed, means to regenerate the bed, preferably by evacuation thereof, and means to control all the aforesaid means such that, in use, the apparatus performs a cycle in which gaseous mixture in a substantially unpressurized condition is drawn through the passage means and then through the bed by said means to apply a reduced pressure to a product outlet of the bed with said regeneration means in operative, and then said regeneration means are operated to regenerate adsorbent, in use, in the bed with said passage means and said reduced pressure applying means isolated from the bed.

The Applicants have found that a process according to the invention for obtaining oxygen-rich gas from air can have the advantage over the above described known methods that, for the same level of vacuum used for regeneration and for the same pressure of the product gas, greater oxygen yields can be obtained and better oxygen purity can be reached more easily. In addition the electrical power required to produce a given quantity of oxygen is less.

A process according to the invention are particularly suitable for producing oxygen or nitrogen rich gases from air but are also suitable for use in the separation of many other gas mixtures. When an oxygen rich gas is required, the bed is normally filled with a zeolite molecular sieve, and when a nitrogen rich gas is required, the bed is normally filled with a carbon molecular sieve.

A process according the the invention preferably uses a plurality of adsorbent beds, e.g. two or three adsorbent beds, with each bed undergoing a similar cycle but out-of-phase with the other bed(s) such that a substantially continuous supply of product gas is produced.

It is preferred that after the, or each, adsorbent bed is regenerated and before the next admission of gaseous mixture to the bed a gaseous mixture enriched in said product gas is admitted to the bed, the pressure in the bed after such admission of gaseous mixture being at a value below atmospheric pressure. Such reduced pressure in the bed assists in drawing in gaseous mixture into the bed during the next admission of gaseous mixture to the bed. Furthermore, such enriched gaseous mixture may be admitted before evacuation of the bed is completed and indeed possibly throughout such evacuation so that it acts as a purging gas to assist regeneration of the adsorbent. In this way a softer vacuum can be used to regenerate the adsorbent. In an arrangement according to the invention in which a plurality of beds are provided, enriched gaseous mixture admitted to the bed as aforesaid is preferably taken from the product outlet of the other, or another, bed.

The product yield can be improved, usually in a three bed arrangement, by collecting as product only an initial part of the gas withdrawn from each bed (usually termed "first cut") and using the remainder of such gas ("second cut") as parts of the feedstock for another bed. The second cut is usually not as rich in the required gas as the first cut but is richer in such gas than the gaseous mixture which constitutes the remainder of the feedstock to the beds.

With many gaseous mixtures it may be necessary to provide a pre-purification stage to remove such impurities as water vapour. In some cycles it may be convenient to include such a pre-purifier as a part of the main adsorbent bed, and indeed it may merely comprise an initial portion, of the adsorbent layer in the bed.

A feature of a process according to the invention is that the rate of flow of the feed gas mixture drawn into the adsorbent bed is not constant. This rate is higher at the beginning of the gas admission period and falls to a minimum just as backfill gas is to be passed to the next bed in a two bed system or just as second cut gas is to be passed to the next bed in a three bed system. The maximum rate can be several times the minimum. This feature leads to advantages over processes where feed is compressed into the plant and a variable feed rate is not easily achieved. With the atmospheric or unpressurised feed the feed gas is drawn into the plant at the rates required by the cycle whereas in the case of feed being compressed in the cycle plant equipment must be arranged to store gas in the plane either in a reservoir or to control operating pressures in the plant whereby such pressures vary as required. An atmospheric feed process thus has the advantages that gas storage vessels

DETAILED DESCRIPTION

Figure 1:
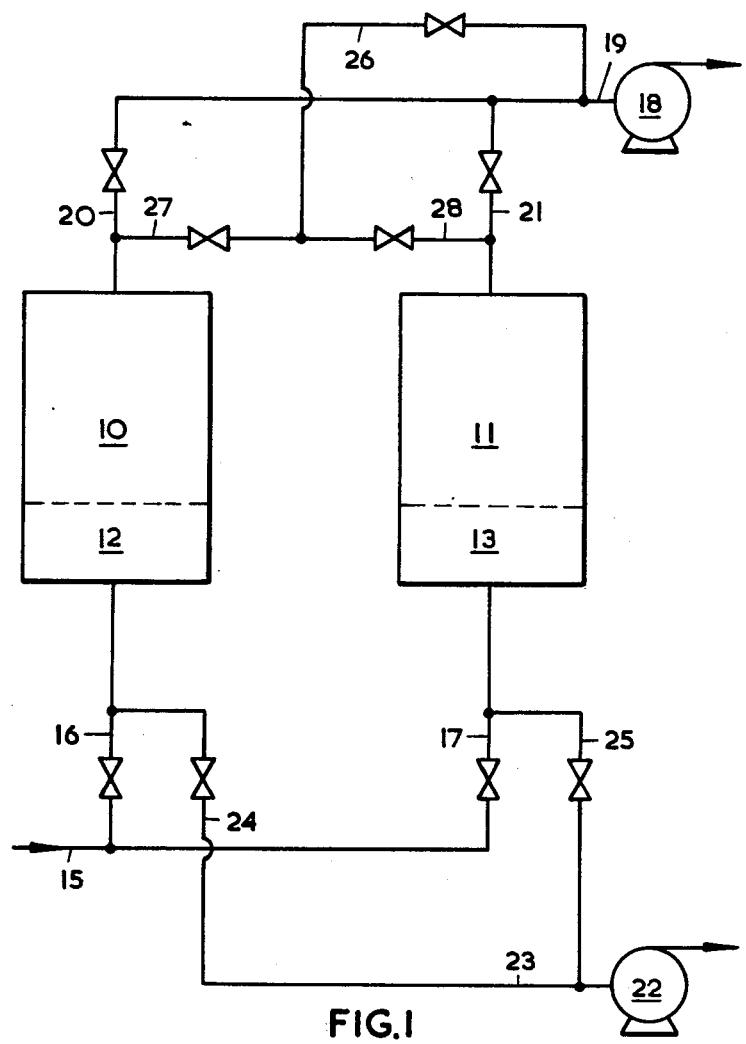
FIG. 1 is a diagrammatic representation of a two bed apparatus embodying the invention.
Figure 2:
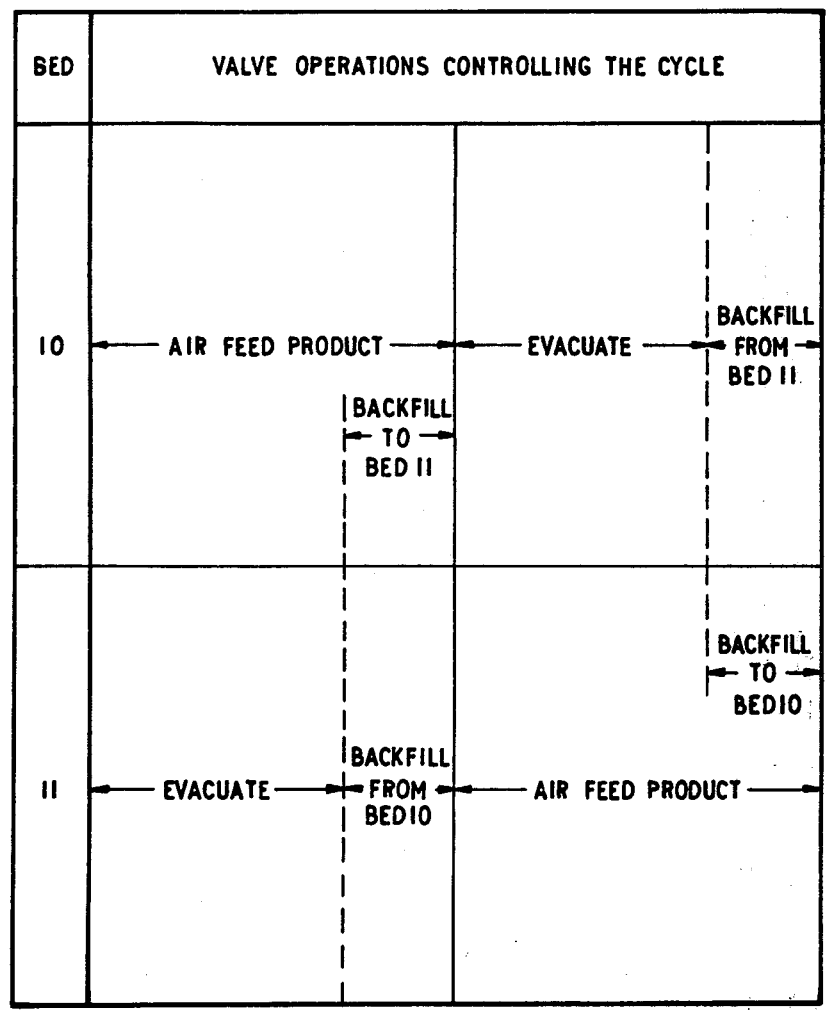
FIG. 2 is a diagram illustrating the operating sequence of the apparatus of FIG. 1.

Referring to FIGS. 1 and 2 of the drawings, an apparatus for producing oxygen rich gas comprises two beds, 10 and 11 which are filled with zeolite molecular sieve, preferably type 5A, with drying sections 12 and 13 at the inlet ends of the beds containing silica gel, activated alumina, silica alumina or 5A or other zeolite molecular sieve.

Air is fed to the beds 10, 11 through line 15 and valved lines 16 and 17. Product gas is withdrawn from the beds by compressor 18 through line 19 and valved lines 20 and 21. The compressor 18 is a pump capable of drawing a soft vacuum and at the same time compressing the gas to a pressure above atmospheric. The beds are regenerated by a vacuum pump 22 which is connected to the beds by line 23 and valved lines 24 and 25. The beds can be backfilled with product gas through valved lines 26, 27 and 28.

The beds operate similar cycles but out-of-phase as shown in FIG. 2. Considering bed 10, when air is to be admitted, the bed is at sub-atmospheric pressure and valved lines 16 and 20 are opened.

Air is drawn into the bed and oxygen product is withdrawn from the bed by compressor 18, which applies a small subatmospheric pressure to the outlet end of the bed while compressing the gas so withdrawn to a superatmospheric pressure. Towards the end of this part of the cycle valved line 28 opens and product quality gas is drawn into bed 11 by the action of the vacuum in bed 11 at a rate controlled by the valved line 26 to back fill bed 11 to reach a pressure below atmospheric and preferably about 500 torr by the end of this part cycle. At this point valve lines 16, 20 and 28 close, and the line 17 opens to admit air to bed 11 and valve line 21 opens to alow oxygen product to be withdrawn from bed 11. Valved line 24 also opens to allow bed 10 to be regenerated by evacuation. Towards the end of this part of the cycle valved line 24 closes and valved line 27 opens to allow bed 10 to backfill to about 450 to 550 Torr, e.g. 500 torr by the end of this part of the cycle. In this way the two beds operate to give a continuous oxygen product flow. It should be noted that at the start of each part of the cycle the pressure at the inlet to the product compressor 18 drops momentarily to about the 500 torr in the bed coming on stream before quickly rising up to just below atmospheric. Also in this cycle the vacuum pump 22 is not utilised during the period of backfilling. Typically for a 60 second half cycle evacuation occupies 40 seconds and backfilling 20 seconds.

The pressure swing cycle employed as well as effecting oxygen enrichment in the molecular sieve sections of the beds is also suitable for efficient operation of the drying section of the beds to protect the molecular sieve section against moisture in the inlet air.

Figure 3:
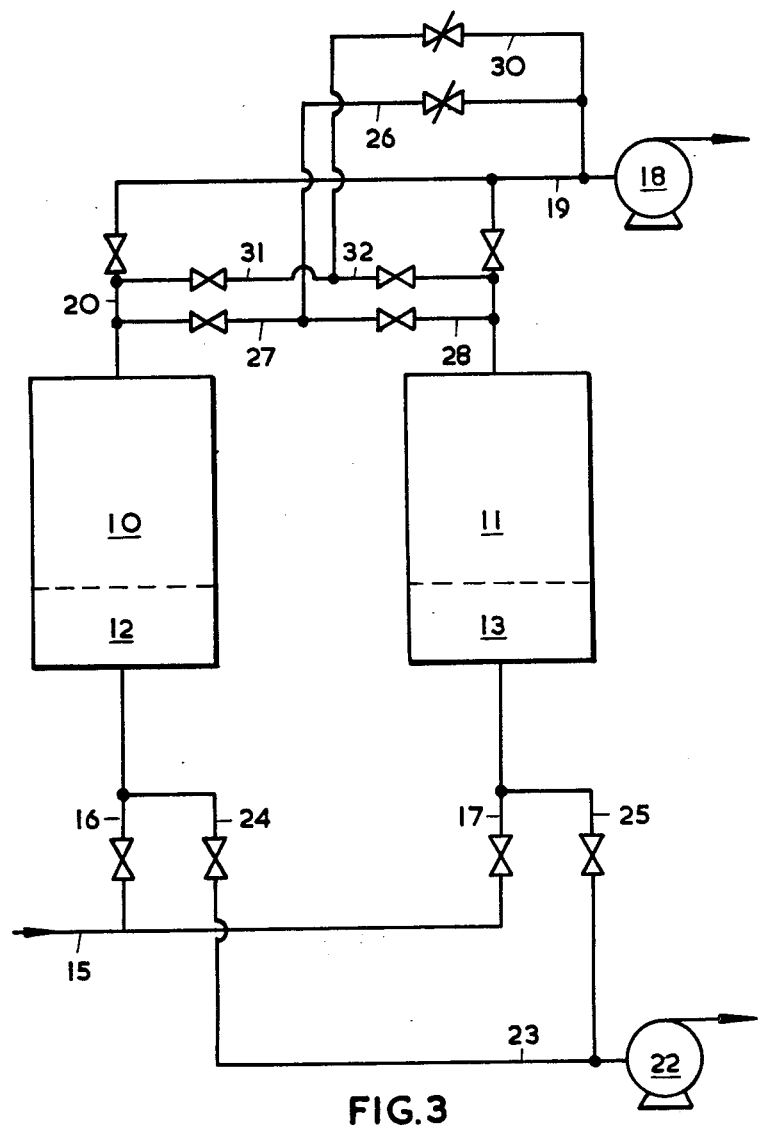
FIG. 3 is a diagrammatic representation of a modified version of the FIG. 1 embodiment.
Figure 4:
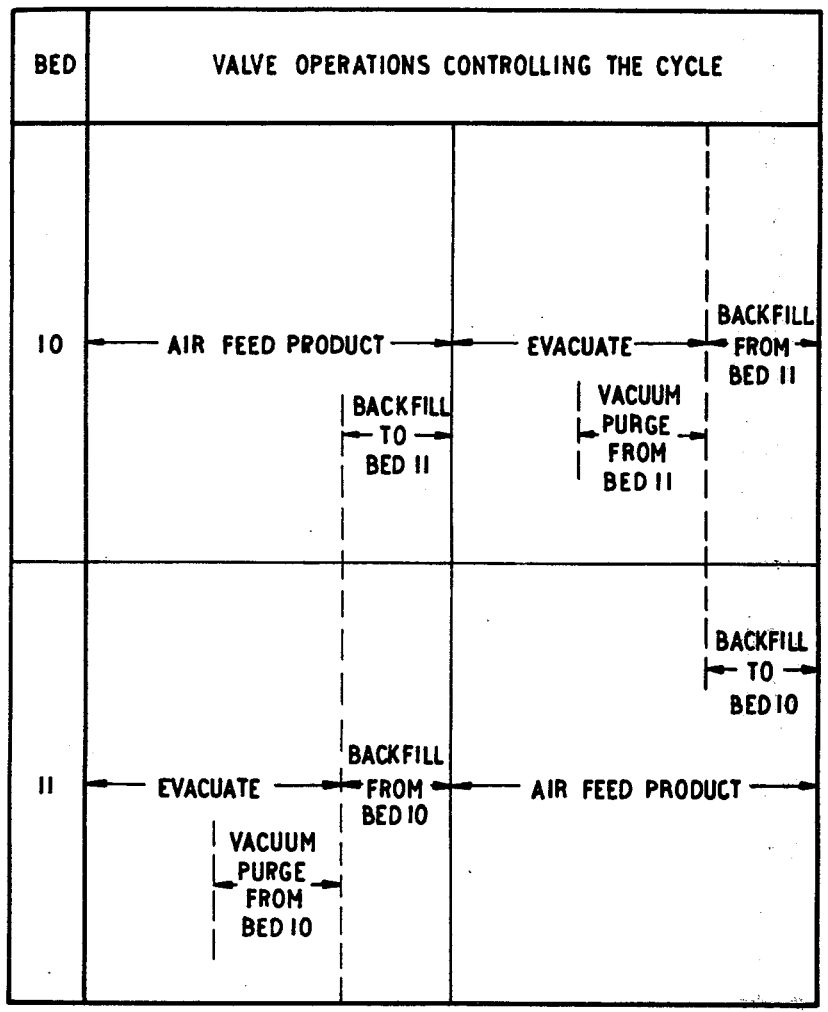
FIG. 4 is a diagram illustrating the operating sequence of the FIG. 3 embodiment.

FIGS. 3 and 4 illustrate a modification of the system illustrated in FIGS. 1 and 2, in which a purge of product quality gas is introduced into the bed being evacuated, i.e. the bed is regenerated by the combined action of a purge and evacuation. This has the advantage of reducing the level of vacuum as compared with that required for vacuum regeneration alone. Thus the vacuum pumping requirements of the process are reduced by this modification and hence the overall power consumption is reduced.

FIG. 3 shows a system similar to that of FIG. 1 and similar parts have been given the same reference numerals. Additionally, there is provided a vacuum purge line 30 with a control valve and further valved lines 31 and 32. There are three possible sequences of operation to effect purging given below, the first two of which utilise the vacuum purge lines whereas the third does not and can therefore be appplied directly to the FIG. 1 embodiment.

(a) Using the vacuum purge line valved line 31 or 32 is opened when the appropriate level of vacuum has been achieved in the respective bed being evacuated and the purge rate is set to hold the level of vacuum approximately constant for the remainder of the evacuation period. The bed is then backfilled through the backfill line 27 or 28.

(b) Using the vacuum purge line, valved line 31 or 32 is opened as soon as the bed begins to evacuate and is held open for the whole of the evacuation period. Backfilling then takes place through the respective line 27 or 28.

(c) No vacuum purge line is used but the backfill valved line 27 or 28 is opened before evacuation is complete to provide the purge flow which becomes the backfill flow when evacuation finishes.

By changing the zeolite molecular sieve to carbon molecular sieve the processes and apparatus described above in relation to FIGS. 1 to 4 will produce nitrogen. The main sections of the beds are filled with carbon molecular sieve suitable for adsorbing oxygen rapidly and nitrogen slowly. The drying section of the bed may be the same carbon molecular sieve or a drying agent such as silica gel, activated alumina or silica alumina. The pressure in the bed at the end of backfilling is expected to be above 400 Torr.

By operating the basic atmospheric cycle or the vacuum purge variation a product enriched in nitrogen is obtained from the process, whilst an oxygen rich waste is withdrawn through the vacuum pump. The nitrogen product obtainable in this way will normally contain about 1% oxygen and will be substantially free of moisture and carbon dioxide impurity.

Figure 5:
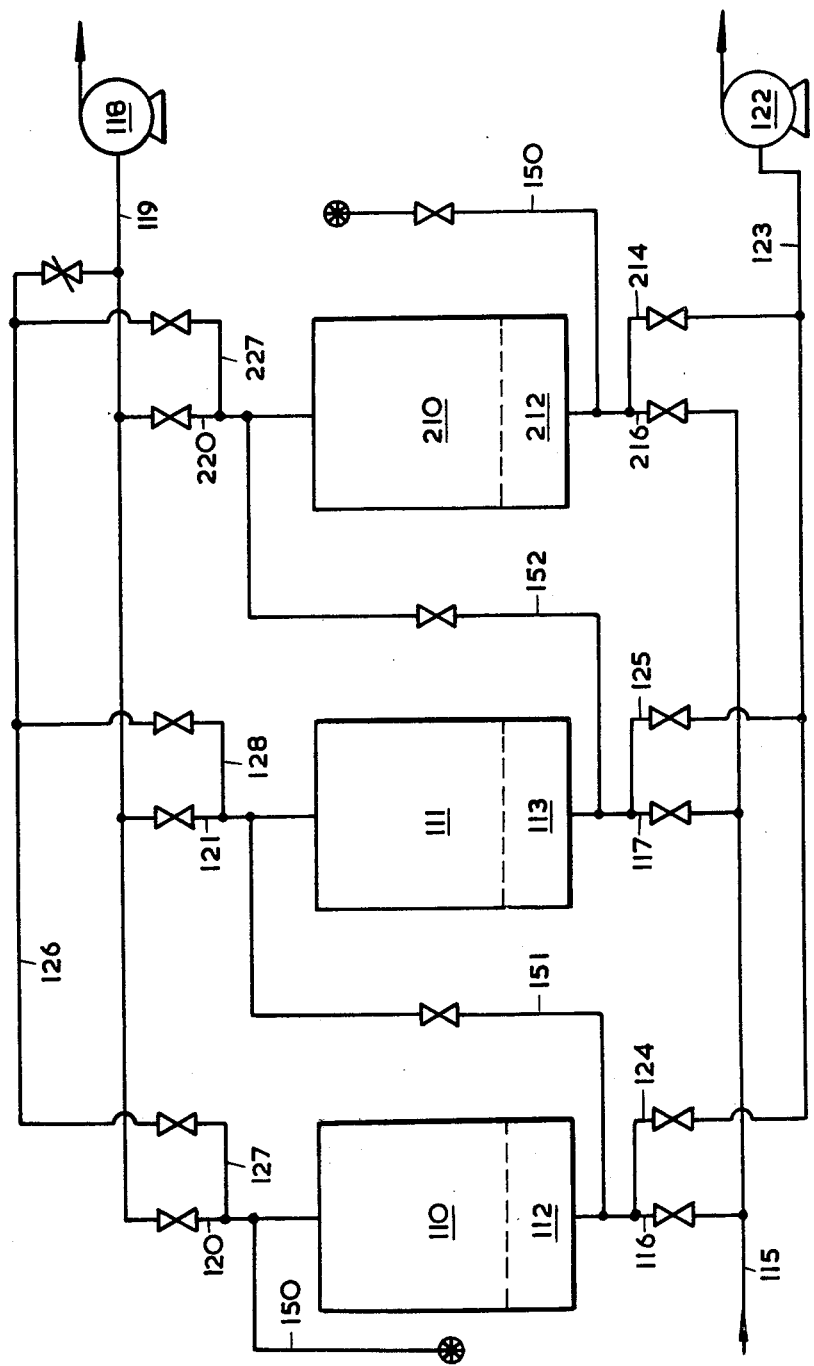
FIG. 5 is a diagrammatic representation of a three bed apparatus embodying the invention.
Figure 6:
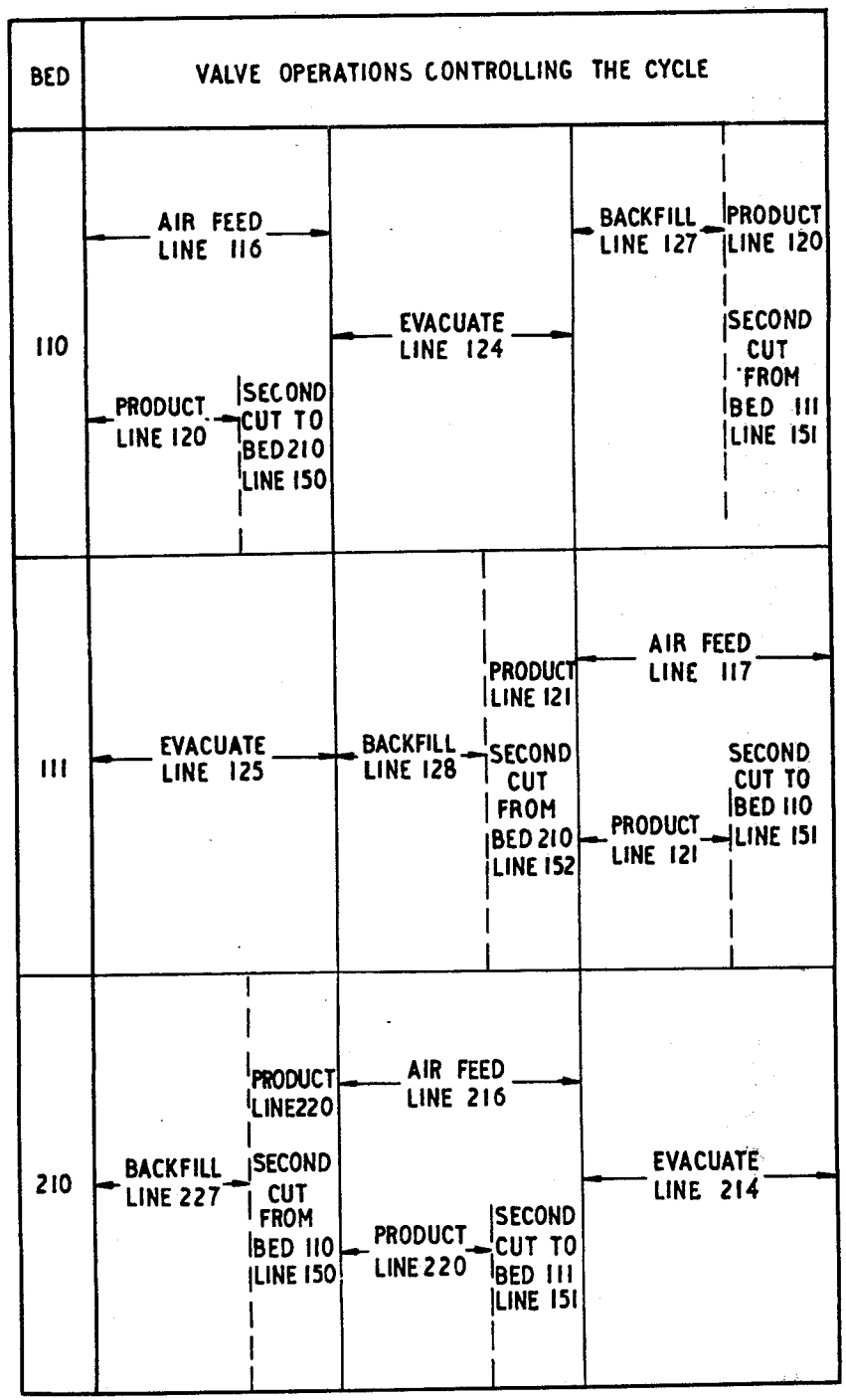
FIG. 6 is a diagram illustrating the operating sequence of the FIG. 5 embodiment.

Referring now to FIG. 5 and 6 a three bed apparatus is shown. Compared with the two bed system the three bed system has the advantages that the vacuum pump is full utilised and that a "second cut" of oxygen rich gas may be introduced after backfilling of a bed is complete, which has the effect of improving the oxygen yield of the process.

FIG. 5 shows the arrangement of the valved lines and FIG. 6 the valve operating cycle. Considering bed 110 at the start of air feed valved lines 116 and 120 are open. Towards the end of the part cycle as the outlet oxygen concentration is about to fall valved line 120 closes and valved lines 150 open to pass a second cut of product to bed 210 which has just completed backfilling. At the end of the part cycle valved lines 150 and 116 close and valved line 124 opens and the bed is regenerated by evacuation to say 150 torr. At the completion of evacuation valved line 124 closes and valved line 127 opens to backfill the bed to about 500 to 600 Torr, e.g. 550 torr, at which point valved line 127 closes and valved line 151 opens to admit second cut gas from bed 111 whilst at the same time valved line 120 opens and oxygen product is drawn out of the bed by the product compressor 118.

When the part cycle time is one minute the backfill time is about 40 seconds and the second cut time 20 seconds.

Work has shown that for operating the cycle in areas of high ambient temperature, say 35°-40° C., it is advantageous to use harder vacuum, as low as 50 torr. These harder vacua are also advantageous if it is required to operate the process near the upper limit of purity of the oxygen product of 95%.

Figure 7:
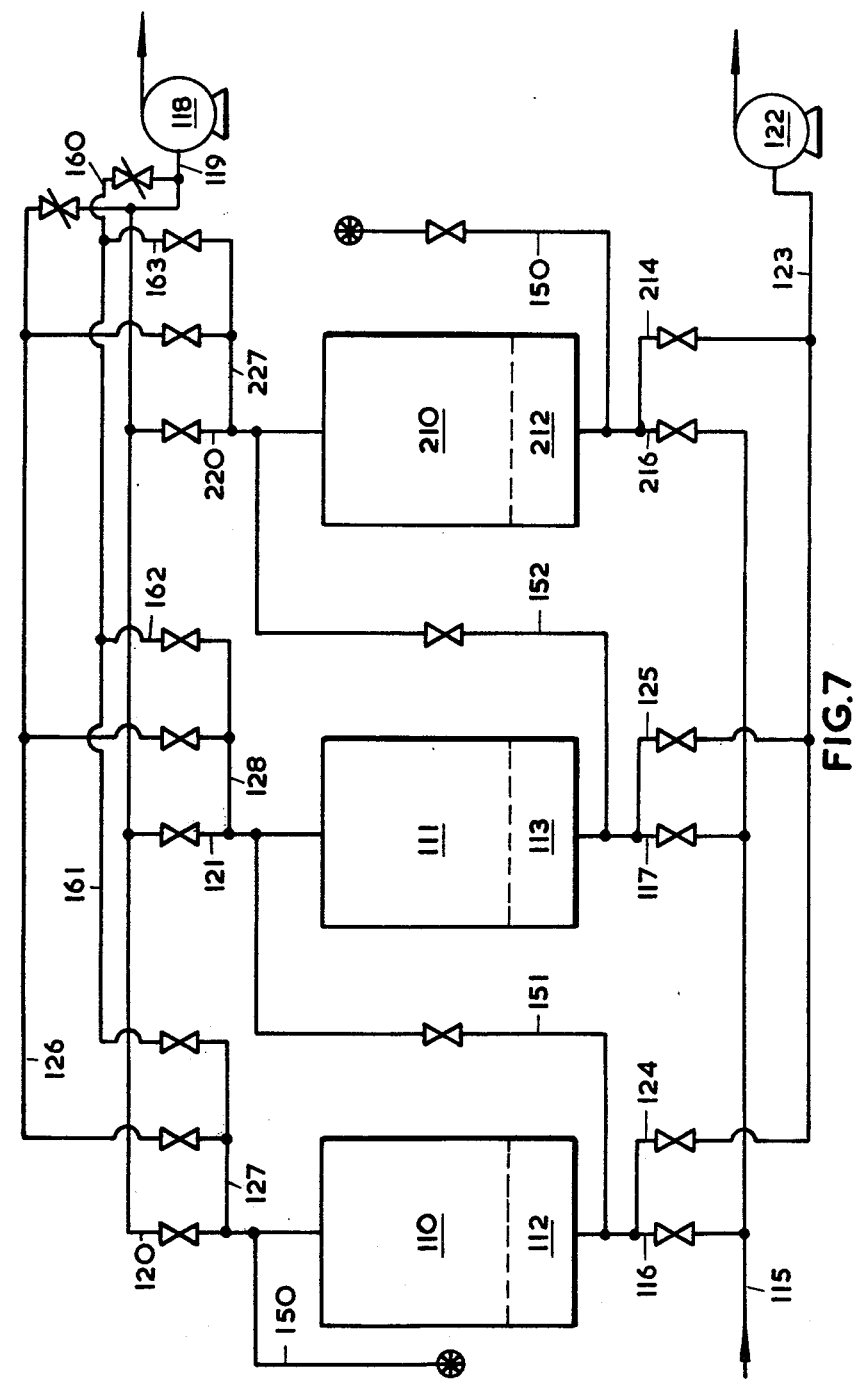
FIG. 7 is a diagrammatic representation of a modified version of the FIG. 5 embodiment; and, FIG. 8 is a diagram, illustrating the operating sequence of the FIG. 7 embodiment.
Figure 8:
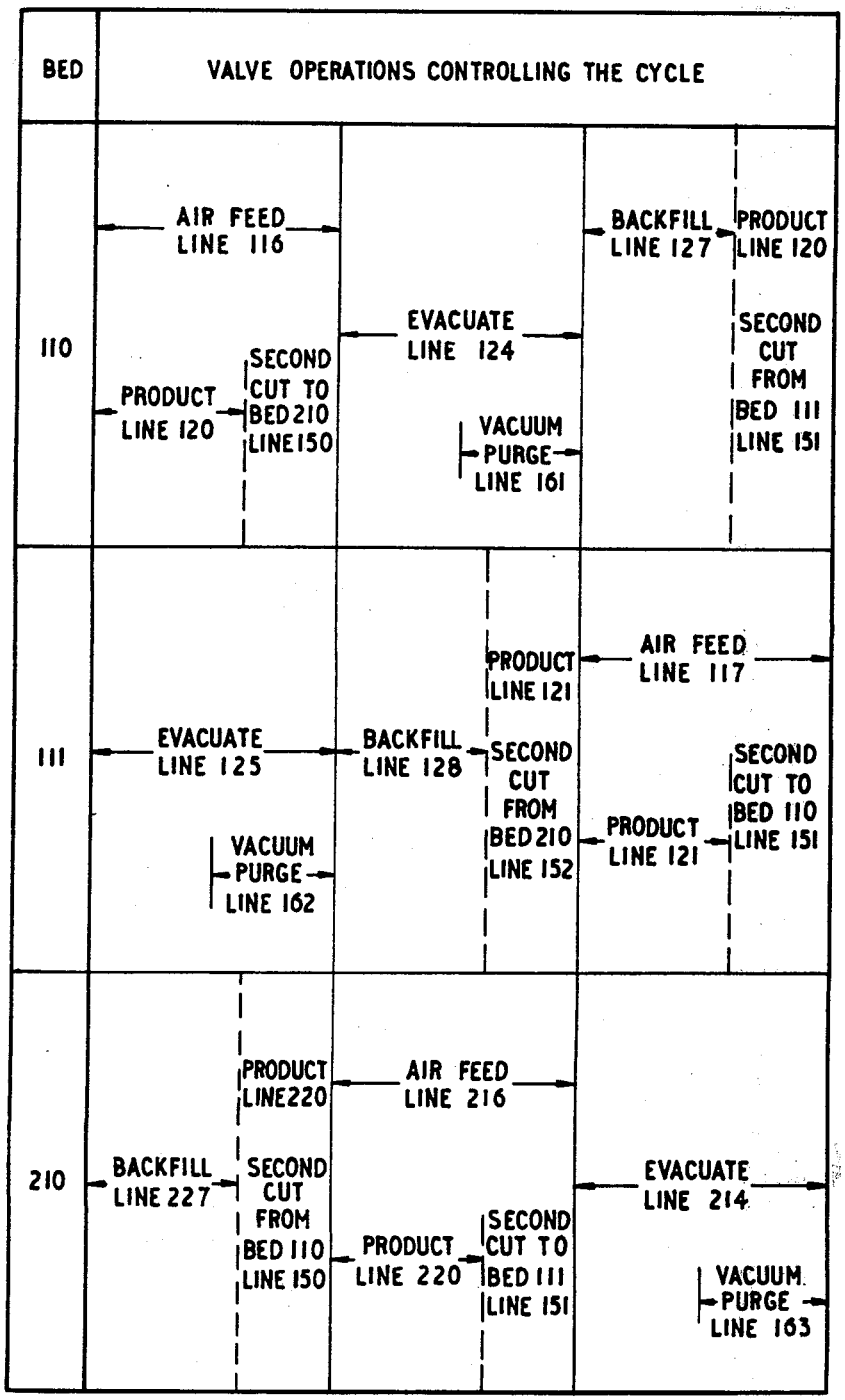

A modification of this system is shown in FIGS. 7 and 8 in which the vacuum regeneration of the beds is assisted by the addition of a purge of product quality gas. The vacuum purge is effected during the evacuation period and a line 160 is provided for this. As with the two bed system described above in relation to FIGS. 1 to 4 the purge may be effected in at least three ways:

(a) Through a vacuum purge line 161 or 162 or 163, starting when the vacuum reaches a chosen level and at a rate set by the valve in line 160.

(b) Through a vacuum purge line 161 or 162 or 163 for the whole of the evacuation period.

(c) By starting backfill of a bed before evacuation is complete.

As for the two bed process filling the beds 110,111,210 with molecular sieve carbon with or without drying sections 112,113,212 makes the same process effective for producing a nitrogen rich product in the region of 99% nitrogen, balance oxygen, and substantially free from moisture and $CO_2$. Again the pressure in the bed after backfilling is expected to be above 400 Torr.

what is claimed is:

1. In a process for increasing the proportion of a selected component in a gaseous mixture wherein the process employs an absorbent bed which preferentially adsorbs one or more other components of the mixture, the bed having an inlet for the gaseous mixture at one end and an outlet for product gas at its opposite end, the improvement comprising repeating a cycle of operation which includes the successive steps of: allowing the gaseous mixture in a substantially unpressurized condition to be drawn into the bed through said inlet while simultaneously withdrawing an unadsorbed product gas from the bed through said outlet, and regenerating the bed by the action of a reduced pressure applied to said inlet without an intervening purge step at least at atmospheric pressure.

2. A process as claimed in claim 1 wherein said gaseous mixture is air.

3. A process as claimed in claim 1 wherein said selected component is oxygen.

4. A process as claimed in claim 3 wherein said adsorbent is a zeolite molecular sieve.

5. A process as claimed in claim 1 wherein said selected component is nitrogen.

6. A process as claimed in claim 5 wherein said adsorbent is a carbon molecular sieve.

7. A process as claimed in claim 1 wherein there is provided a plurality of adsorbent beds, each bed undergoing a similar cycle but out-of-phase with the other bed(s) such that a substantially continuous supply of product gas is produced.

8. A process as claimed in claim 1 wherein after said application of a reduced pressure to said inlet of said bed, and before the next admission of gaseous mixture to the bed a gaseous mixture enriched in said gas is admitted to the bed, the pressure in the bed after such admission of enriched gaseous mixture being at a value below atmospheric pressure.

9. A process as claimed in claim 8 wherein the enriched gaseous mixture is admitted throughout said application of a reduced pressure to said inlet of the bed so that it acts as a purging gas to assist regeneration of the adsorbent.

10. A process as claimed in claim 8 in which a plurality of beds are provided, wherein enriched gaseous mixture admitted to the bed as aforesaid is taken from the product outlet of the other, or another bed.

11. A process as claimed in claim 1 wherein a plurality of adsorbent beds are provided and wherein an initial part only of the gas withdrawn from the outlet of each bed is collected as product and the remainder of such gas is used as part of the feedstock for another bed.

12. A process as claimed in claim 1 wherein a prepurification stage is provided to remove impurities from the gaseous mixture.

13. A process as claimed in claim 12 wherein a prepurifier comprises a part of the main adsorbent bed.

14. A process as claimed in claim 13 wherein the prepurifier comprises an initial portion of the adsorbent layer in the bed.

* * * * *